April 18, 1961 F. H. RAYMOND 2,980,804

BINARY CODED INFORMATION PROCESSING DEVICES

Filed Jan. 8, 1957

INVENTOR

Francois H. Raymond

BY Kemon, Palmer & Stewart

ATTORNEYS 2,980,804

BINARY CODED INFORMATION PROCESSING DEVICES

Francois Henri Raymond, Saint-Germain-en-Laye, France, assignor to Societe d'Electronique et d'Automatisme, Courbevoie, France Filed Jan. 8, 1957, Ser. No. 633,132

Claims priority, application France Jan. 11, 1956

11 Claims. (Cl. 307—88)

The present invention relates to improvements in binary coded information processing devices, viz. devices able to perform transfer of data as well as logical operations such as intersection and/or union from one or more sets of binary coded data.

In a binary coded information signal each bit is one of the two terms of an alternative. Within a digital computer, a bit of information may also be called a digit.

A known method of representing such bits of information in a computer circuit involves the use of a magnetic core, usually a toroid, made of a saturable material which may or may not present a substantially rectangular hysteresis loop. Such a magnetic core has at least two conditions of magnetisation, one of which may be used for representing the value zero of any binary digit and the other one of which may accordingly be used for representing the value one of any binary digit. The digital value one may for instance correspond to a saturated condition of the said core and the digital value zero may accordingly correspond to a desaturated condition of the said core. Such a condition may be impressed upon a core through an input winding and, at any time, the condition of the said core may be "read" from an output winding the electrical impedance of which to an electrical current circuit is low when the core is in a saturated condition and higher when the core is unsaturated.

It is the object of the invention to provide a new and improved magnetic core device of the above-specified kind which relies upon such a change of impedance of windings on saturable magnetic cores for performing transfers and logical combinations of information bits or digits.

Since magnetic core computing techniques are now well known, it is thought unnecessary to detail the manner in which elementary data processing devices, of the above specified kind, may be interassociated for the constitution of complete units of computing systems.

A binary coded information processing device according to the invention is mainly characterized in that it includes the combination of at least one first magnetic core and at least input and output windings on this first core, at least one second magnetic core and input and output windings on the said second core, an intermediate magnetic core and input, output and preset windings on this intermediate core, a series current circuit from a first intermittent current source including the said preset winding on the intermediate core, a series current circuit from a second intermittent current source including the output winding of the first core and the input winding of the intermediate core, and a series current circuit from a third intermittent source including the output winding of the intermediate core and the input winding of the second magnetic core, the periods of activation of the said first, second and third intermittent current sources being relatively shifted with respect to the time.

For performing logical operations of union and/or intersection on a plurality of separate informations, a corresponding plurality of first magnetic cores is provided, the output windings of which are connected together in series and/or in shunt relation in the said series current circuit from the second intermittent current source.

For distributing the transferred and/or result signals to a plurality of stages, a corresponding plurality of second cores are provided, the input windings of which are serially connected together in the said series current circuit from the third intermittent current source.

Briefly stated, the operation of such devices may be summarized as follows: the activation of the first source brings the said intermediate core to a saturated condition; according to the magnetic condition of the first magnetic core or cores, the activation of the second source either maintains or enhances the saturated condition of the said intermediate core or let it fall or bring it to a desaturated condition, as the case may be; the subsequent activation of the said third source, according to whether the said intermediate core is or is not saturated, brings or does not bring the second magnetic core or cores to a saturated condition thereof.

For a more detailed disclosure, reference will now be made to the accompanying drawings, wherein.

Figures 1, 2:
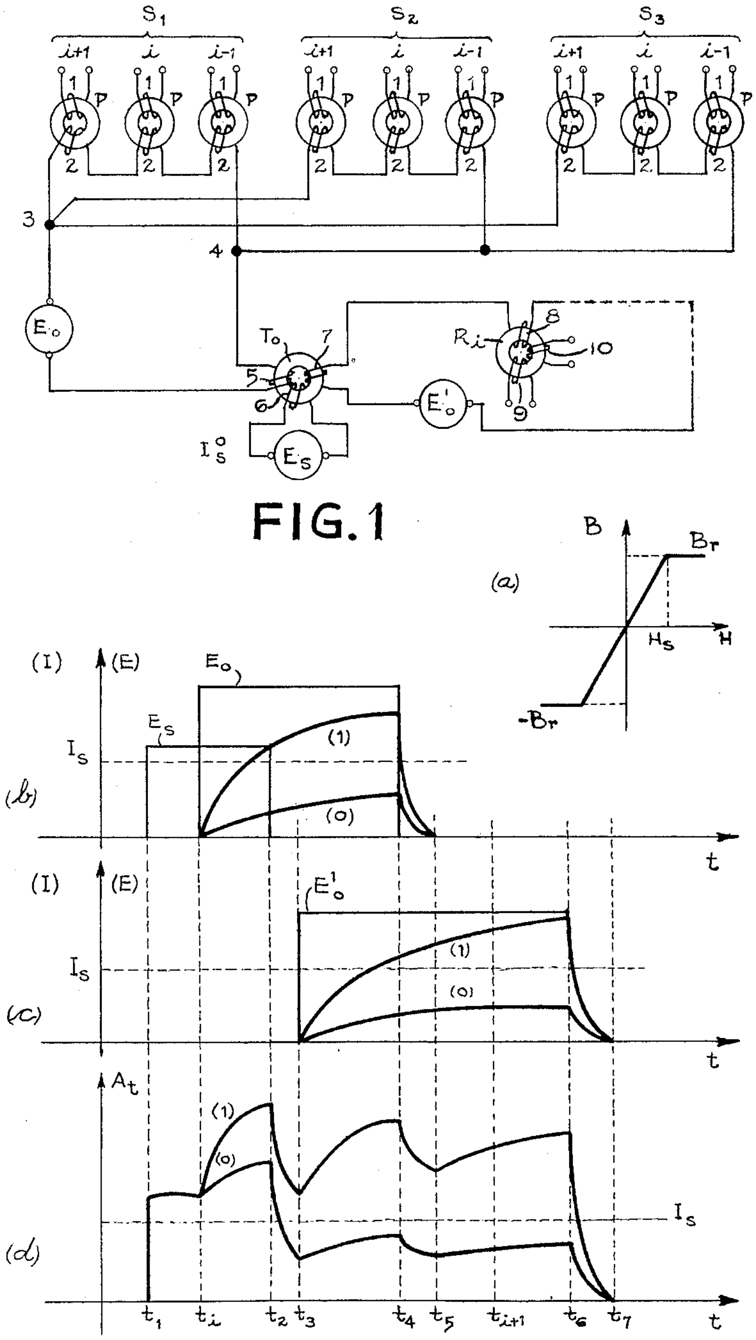
Fig. 1 shows an illustrative embodiment of a data processing device according to the invention.
Fig. 2 shows various graphs relating to the operation of the embodiment disclosed in Fig. 1.

The device shown in the drawing realises an operation which is a union of several intersections, from which any other combination of such elementary logical operations will be apparent to the person skilled in the art.

In Fig. 1, three groups of magnetic cores are illustratively shown, each group including three magnetic cores. These groups are respectively referred to as $S_1$, $S_2$ and $S_3$. Each core in the said group is referred to as P. In each of the said groups the said cores receive the respective signals $i-1$, $i$ and $i+1$ through their respective input windings 1. Of course the actual values of the said nine signals are not, or may be not identical. In each group, the cores are interassociated from the serial connection of their output windings 2. These three serial interconnections are connected in relative parallel arrangement with respect to the points 3 and 4.

A current source $E_0$, is connected to both points 3 and 4 from its respective ends, through a winding 5 of an intermediate magnetic core $T_0$, inserted for instance in serial connection between one of the poles of the source $E_0$ and the said point 4. When the source of test current $E_0$ is activated, the current flowing through the said winding 5 will represent the result of a logical operation including the union of three triple intersections:

$$F=(i+1).(i).(i-1)_{S1}+(i+1).(i).(i-1)_{S2}+(i+1).(i).(i-1)_{S3}$$

The magnetic core $T_0$ bears a preset control winding 6 serially connected in the circuit of a source of presetting current $E_s$. It is also provided with an output winding 7 serially connected in the circuit of a source of current $E_0^1$, which also feeds, when activated, at least one winding 8 of at least one receiving magnetic core $R_1$. Only one of such cores has been shown, but there may be a plurality of such cores, the input windings 8 of which are serially connected in the dot-line portion indicated in the circuit of the source $E_0^1$ in an apparent way.

This latter magnetic core $R_1$ is shown with two other windings 9 and 10. This is intended to indicate that such logical arrangements as shown may be, if required, cascaded according to any combinations useful in a more complex computing design. For instance, the winding 9 may be controlled from a remote control circuit for the selection of such a receiver core as $R_1$ in the registration of the logical result or for the inhibition thereof.

The winding 10 may be an output winding for the said core $R_1$.

It may be now assumed that the magnetization idealized curve of the magnetic material of the above identified cores is such as shown in part *a* of Fig. 2.

Magnetic materials of substantially rectangular hysteresis loop may be used for all cores P and R, if desired.

In the following, and with respect to the contemplated curve of part *a* of Fig. 2, any input signal to the cores P will last at least during part of the activation period of the source $E_0$.

The source of current $E_s$ is activated during the reception of the input signals upon the input windings 1 of the magnetic cores P, with a suitable phase shift with respect to the said signals. From the instant of activation of the said source $E_s$, the winding 6 on the core $T_0$ receives a current from an instant $t_1$ to an instant $t_2$ on either side of an instant $t_i$, which marks some clock timing of the computer. The length in time of such a clock interval is from $t_i$ to $t_{i+1}$, graphs *b* to *d* of Fig. 2. The interval of the "pulse" $E_s$ is clearly visible on the graph *b* which shows the current through the winding 5 of $T_0$ and the time intervals of activation of the sources $E_0$ and $E_s$ and the ampere-turns developed by the current therefrom upon $T_0$ are indicated on the graph *d*. In this latter graph, is shown the evolution of the ampere-turns upon $T_0$ from all the windings thereof during a complete cycle of operation of the device.

The ampere-turns due to $E_s$ bring the material of the core $T_0$ to the saturation point $H_s/B_r$, graph *a* of Fig. 2. Before this, the material of $T_0$ was at the zero saturation point O of the same graph.

At the time instant $t_i$, the current source $E_0$ is activated, graph *b* of Fig. 2. It will remain activated until an instant $t_4$ after the instant $t_2$.

Two alternatives may then occur: (1) all the cores P are saturated which means that all the information bits on the cores P have the digital value 1; (2) one at least of the said cores is not saturated which means that one at least of the information bits on the cores P presents the digital value 0. If all cores are saturated, the current will establish according to the curve 1 of the said graph *b* through winding 5 of the core $T_0$, and the ampere-turns on the core $T_0$ will develop according to the curve 1 on the graph *d* of Fig. 2. The dotted line $I_s$ indicates therein the ampere-turns necessary for maintaining the core $T_0$ in its saturated condition. When $E_s$ becomes inactivated, at the time instant $t_2$, the ampere-turns will fall but the core $T_0$ remains in a saturated condition. If nothing else were provided, this saturated condition would be maintained until the instant $t_4$ when $E_0$ drops to zero. From this instant, the said core $T_0$ would desaturate from $t_4$ to $t_5$. However, at an intermediary time instant $t_3$, the current source $E_0^1$ has been in turn activated, graph *c* in Fig. 2. A transfer circuit towards the receiving cores such as $R_1$ is closed through the winding 7 of $T_0$. The current therein will develop according to the curve 1 of the graph *c* and the ampere-turns will follow the corresponding curve of the graph *d*. The receiving cores will be saturated and remain in the said condition until the source $E_0^1$ is de-activated, at $t_6$. The core $T_0$ will then become progressively desaturated during the period from $t_6$ to $t_7$.

If, on the other hand, when the source $E_0$ is activated, one at least of the cores P was in the desaturated condition thereof, the current from $E_0$ through the winding 5 of the core $T_0$ flows according to the curve 0 in the graph *b* and consequently, following the end of the activation period of $E_0$, the core $T_0$ is not saturated, see the graph *d*. The transfer current flows according to the curve 0 of the graph *c* and does not saturate the core $R_1$. The graph *d* shows complete variation with the time of the ampere-turns for this case, curve 0 from $t_1$ to $t_7$.

Obviously such an operation as described may be made to occur at the very clock frequency of the computer wherein such an arrangement is used, as the cores such as $R_1$ may then constitute cores such as P for further processing devices for which the source corresponding to $E_0$ in the described circuit will be activated from the time instant $t_{i+1}$, and so forth.

When the cores are of a material having a substantially rectangular hysteresis loop, the input signals to the cores P may only last until the time instant $t_i$, a resetting being provided for such cores after $t_4$.

What I claim is:

1. A binary information processing device comprising in combination first and second magnetic core means of saturable material, input means for the said first magnetic core means for the control of the magnetic condition thereof, output means for the said first magnetic core means the impedances of which vary according to the magnetic condition of the said first core means, intermediate magnetic core means of saturable material, means for presetting the magnetic condition of the said intermediate core means, means for controlling the magnetic condition of the said intermediate core means after the said presetting under the control of the impedance condition of the said output means for the said first magnetic core means, input means for the said second magnetic core means for controlling the magnetic condition thereof, and transfer means for controlling the said input means for the said second core means from the magnetic condition of the said intermediate magnetic core means after the control thereof from the said impedance output condition of the said first magnetic core means.

2. A binary information processing device according to claim 1, wherein the said intermediate magnetic core means consists of a single magnetic core and wherein the said first magnetic core means consists of a plurality of separate magnetic cores.

3. A binary information processing device according to claim 2 wherein each one of the said separate magnetic cores in the said first magnetic core means is provided with an output winding serially connected in a circuit including an intermittently activated current source, said circuit including at least one of the other output windings of the said first magnetic core means and an input winding on the said intermediate magnetic core.

4. A binary information processing device according to claim 2 wherein each one of the said separate magnetic cores in the said first magnetic core means is provided with an output winding and a serially connected circuit including, in series circuit connection, an intermittently activated current source, certain output windings of the said first magnetic core means connected in parallel relation, and in input winding on the said intermediate magnetic core.

5. A binary information processing device according to claim 2 wherein each one of the said separate magnetic cores in the said first magnetic core means is provided with an output winding, part of the said output windings being serially connected as a group, and each group of such serially connected windings being shunt-connected into a circuit including an intermittently activated current source, and an input winding of the said intermediate magnetic core.

6. A binary coded information processing device including the combination of at least one first magnetic core and at least input and output windings on said first core, at least one second magnetic core and input and output windings on the said second core, an intermediate magnetic core and input, output and preset windings on this intermediate core, a series current circuit from a first intermittent current source including the said preset winding on the intermediate core, a series current circuit from a second intermittent current source including the output winding of the first core and the input winding of the intermediate core, and a series current circuit from a third intermittent source including the output winding of the intermediate core and the input winding of the second magnetic core, the periods of activation of the said first, second and third intermittent current sources being relatively shifted with respect to time.

7. The combination according to claim 6 wherein there exists a plurality of first magnetic cores, a separate input winding and a separate output winding on the said cores and wherein the said output windings of the said first magnetic cores are inserted into a circuit including the said second intermittent current source.

8. The combination according to claim 7, wherein part at least of the said output windings are serially inserted in the said circuit.

9. The combination according to claim 7, wherein part at least of the said output windings are shunt connected into the said circuit.

10. The combination according to claim 6, wherein each magnetic core thereof is of saturable and an hysteretic magnetic material.

11. The combination according to claim 6, wherein each first and second core are of an hysteretic magnetic material and provided with a reset winding thereon.

References Cited in the file of this patent

UNITED STATES PATENTS

| | | |
|---|---|---|
| 2,710,952 | Steagall | June 14, 1955 |
| 2,742,632 | Whitely | Apr. 17, 1956 |
| 2,776,419 | Rajchman et al. | Jan. 1, 1957 |
| 2,781,503 | Saunders | Feb. 12, 1957 |
| 2,805,408 | Hamilton | Sept. 3, 1957 |